(12) United States Patent
Zhang et al.

(10) Patent No.: US 9,619,402 B1
(45) Date of Patent: Apr. 11, 2017

(54) METHOD AND APPARATUS FOR OPTIMIZING TRANSLATION OF A VIRTUAL MEMORY ADDRESS INTO A PHYSICAL MEMORY ADDRESS IN A PROCESSOR HAVING VIRTUAL MEMORY

(71) Applicant: Marvell International Ltd., Hamilton (BM)

(72) Inventors: Rong Zhang, Gilbert, AZ (US); Frank O'Bleness, Tempe, AZ (US); Tom Hameenanttila, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 557 days.

(21) Appl. No.: 14/091,226

(22) Filed: Nov. 26, 2013

Related U.S. Application Data

(60) Provisional application No. 61/730,722, filed on Nov. 28, 2012.

(51) Int. Cl.
  *G06F 3/00* (2006.01)
  *G06F 13/18* (2006.01)
  *G06F 12/1027* (2016.01)
  *G06F 12/1009* (2016.01)
  *G06F 12/02* (2006.01)
  *G06F 12/109* (2016.01)

(52) U.S. Cl.
  CPC .......... *G06F 12/1027* (2013.01); *G06F 12/02* (2013.01); *G06F 12/109* (2013.01); *G06F 12/1009* (2013.01)

(58) Field of Classification Search
  CPC .. G06F 12/1009; G06F 12/1027; G06F 12/02; G06F 12/109
  USPC ............................................ 710/62; 711/158
  See application file for complete search history.

(56) References Cited

U.S. PATENT DOCUMENTS

| | | | | | |
|---|---|---|---|---|---|
| 5,765,209 | A | * | 6/1998 | Yetter | G06F 12/1027 711/200 |
| 5,815,686 | A | * | 9/1998 | Earl | G06F 9/45504 703/26 |
| 6,145,064 | A | * | 11/2000 | Long | G06F 12/1018 711/158 |
| 2009/0327646 | A1 | * | 12/2009 | Jordan | G06F 12/1036 711/207 |
| 2012/0072697 | A1 | * | 3/2012 | Rozas | G06F 12/1054 711/207 |

* cited by examiner

*Primary Examiner* — Titus Wong

(57) ABSTRACT

The present disclosure provides a device comprising a memory translation buffer configured to manage (i) a first request for a first search in a page table, wherein the first request is responsive to a first null result of a search for a first address translation in a translation look-aside buffer ("TLB") and (ii) a second request for a second search in the page table, wherein the second request is responsive to a second null result of a search for a second address translation in the TLB. The memory translation buffer is also configured to compare a virtual memory address of the first request to a virtual memory address of the second request and, based on a result of the comparing the virtual memory address of the first request to the virtual memory address of the second request, access the page table to perform the second search.

15 Claims, 4 Drawing Sheets

METHOD AND APPARATUS FOR OPTIMIZING TRANSLATION OF A VIRTUAL MEMORY ADDRESS INTO A PHYSICAL MEMORY ADDRESS IN A PROCESSOR HAVING VIRTUAL MEMORY

CROSS REFERENCE TO RELATED APPLICATIONS

This claims priority to U.S. Provisional Patent Application No. 61/730,722, filed on Nov. 28, 2012, which is incorporated herein by reference.

TECHNICAL FIELD

Embodiments of the present disclosure relate to computer memory, and more particularly, to virtual memory systems and processor architectures.

BACKGROUND

In modern processors adopting a virtual memory system architecture, a virtual memory address is translated into a physical memory address before the virtual memory address is used to fetch instruction or data contents from the physical memory. A translation process of the physical memory address typically involves a Translation Look-aside Buffer (TLB) lookup first. If there is a hit in the TLB, a translation result is returned. If there is a miss, the process proceeds to a "table walk" to acquire translation data. A table walk generally involves several memory accesses. Thus, TLB misses generally lead to a TLB miss penalty that can be large (e.g., many 100's of cycles). Larger virtual address ranges correspond to a larger TLB miss-penalty since larger virtual address ranges involve more levels of walk and more memory accesses.

SUMMARY

In various embodiments, the present disclosure provides a device comprising a memory translation buffer configured to manage (i) a first request for a first search in a page table, wherein the first request is responsive to a first null result of a search for a first address translation in a translation look-aside buffer ("TLB") and (ii) a second request for a second search in the page table, wherein the second request is responsive to a second null result of a search for a second address translation in the TLB, wherein the first request for the first search occurs before the second request for the second search. The memory translation buffer is also configured to compare a virtual memory address of the first request to a virtual memory address of the second request and, based on a result of the comparing the virtual memory address of the first request to the virtual memory address of the second request, access the page table to perform the second search.

In other embodiments, the present disclosure provides a method comprising managing (i) a first request for a first search in a page table, wherein the first request is responsive to a first null result of a search for a first address translation in a translation look-aside buffer and (ii) a second request for a second search in the page table, wherein the second request is responsive to a second null result of a search for a second address translation in the TLB, wherein the first request for the first search occurs before the second request for the second search. The method further comprises comparing a virtual memory address of the first request to a virtual memory address of the second request and, based on a result of the comparing the virtual memory address of the first request to the virtual memory address of the second request, accessing the page table to perform the second search.

In still other embodiments, the present disclosure provides a system comprising a processor, a translation look-aside buffer to (i) receive a search instruction from the processor and (ii) maintain a cache of address translations, and a memory translation buffer configured to: manage (i) a first request for a first search in a page table, wherein the first request is responsive to a first null result of a search for a first address translation in the translation look-aside buffer and (ii) a second request for a second search in the page table, wherein the second request is responsive to a second null result of a search for a second address translation in the TLB, wherein the first request occurs before the second request; compare a virtual memory address of the first request to a virtual memory address of the second request; and based, at least in part, on a result of the comparing the virtual memory address of the first request to the virtual memory address of the second request, access the page table to perform the second search.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
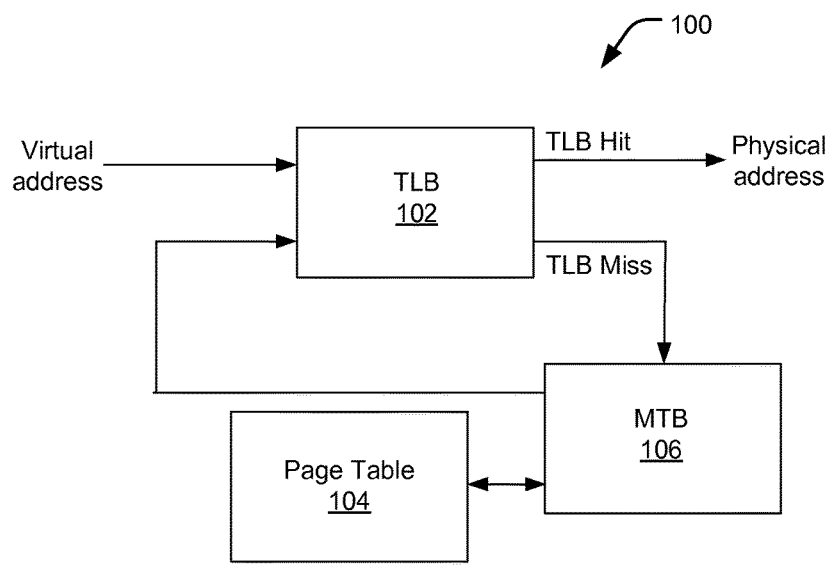
FIG. 1 is a block diagram of a virtual memory system, according to embodiments.

Example embodiments herein describe a number of devices, systems, and techniques for translating virtual memory addresses to physical memory addresses. A virtual memory address is translated into a physical memory address before the virtual memory address is used to fetch contents (e.g., instructions or data) from physical memory. Such translation can begin by looking (or searching) in a table that lists virtual memory addresses and their corresponding physical memory addresses. Such a table is commonly referred to as a translation look-aside buffer (TLB), which stores a cache of recently or frequently used translations. If a virtual memory address and its corresponding physical memory address are found in the TLB as a result of a TLB look-up, then the translation is complete and a physical memory access can proceed—such a situation is referred to as a TLB hit. If the virtual memory address is not found in the TLB, then the TLB look-up yields a null result and the translation is not complete—such a situation is referred to as a TLB miss. An address translation involving a TLB hit is relatively fast, whereas an address translation involving a TLB miss is relatively slow.

In the case of a TLB miss, translating a virtual memory address to a physical memory address involves generating a physical memory address by searching a page table in a process called a table walk or search. A page table is a data structure used by an operating system of a computer to store a mapping between virtual memory addresses and physical memory addresses. A table walk in a page table can involve several memory accesses (e.g., to the page table) to generate a physical memory access. Thus, a TLB miss penalty can be large (e.g. hundreds of processor cycles).

In some cases, translations resulting from table walks can be used to populate a TLB. Accordingly, a subsequent encounter of a virtual memory address, which previously involved a TLB miss, can result in a TLB hit.

To reduce TLB miss penalty, intermediate table walk entries can be cached in a TLB in addition to caching a final translation result. This can allow subsequent table walks to proceed quickly when such intermediate table walk entries match portions of virtual memory addresses associated with the subsequent table walks. A TLB can have multiple table walks pending. For example, if a TLB miss results in a table walk, a new TLB miss needs not wait for the prior table walk to complete before starting its table walk.

If there is no correlation among virtual memory addresses of pending table walks, then every potential memory look-up is performed for new translations. However, if a virtual memory address of a new table walk matches at least a portion of a virtual memory address of a prior table walk, then results of the prior table walk can be used to advance the new table walk closer to completing a translation to a physical memory address. Thus, in this case, a TLB miss penalty associated with the new table walk can be reduced compared to a case where results of the prior table walk are not used.

In some embodiments, a method includes tracking pending table walk requests and comparing addresses associated with the pending table walks. Such a method can reduce a number of page table accesses compared to other methods that don't track pending table walk requests. TLB misses lead to such table walk requests. A memory translation buffer (MTB) is used to track pending table walk requests and establish a dependency for a younger table walk request on an older pending table walk requests (e.g. table walks in-progress). In particular, such dependency is based, at least in part, on matches between one or more portions of virtual memory addresses associated with the younger table walk request and the older pending table walk request. For example, there is no dependency if every portion of the virtual memory address associated with the younger table walk request is different from every portion of the virtual memory address associated with the older pending table walk request. On the other hand, an MTB can establish the younger table walk request as being dependent on the older table walk request when one or more portions of the virtual memory address associated with the younger table walk request matches one or more portions of the virtual memory address associated with the older table walk request. These portions of a virtual memory address correspond to levels, as explained below.

FIG. 1 is a block diagram of a virtual memory system 100, according to embodiments. Virtual memory system 100 can be used to translate a virtual memory address into a physical memory address so that the virtual memory address can be used to fetch contents from physical memory. Such translation begins by looking in a TLB 110, which lists virtual memory addresses and their corresponding physical memory addresses, although such listing may not include all virtual memory addresses. For a TLB hit, a virtual memory address and its corresponding physical memory address are found in the TLB as a result of a TLB look-up. Accordingly, translation is complete and a physical memory access can proceed. For a TLB miss, the virtual memory address is not found in the TLB, the TLB look-up yields a null result, and the translation is not complete. In this case, translating a virtual memory address to a physical memory address involves generating a physical memory address by searching page table 104 in a table walk. However, a TLB miss generates a table walk request, which is forwarded to (or in some implementations, generated by) MTB 106. A TLB miss can also result in the allocation of an MTB entry. Subsequently, MTB 106 manages table walk requests.

For example, MTB 106 tracks pending table walk requests and establishes dependencies for younger table walk requests on older pending table walk requests. In particular, such dependency is based, at least in part, on matches between one or more portions of virtual memory addresses associated with the younger table walk request and the older pending table walk request. In view of such dependency, MTB 106 only advances a younger table walk request to a table walk of page table 104 after completion of a table walk for the older table walk request. More specifically, MTB 106 advances the younger table walk request to a table walk after the table walk for the older table walk request is completed to a particular level. This level corresponds to a match between a portion of the virtual memory address for the younger table walk request and a portion of the virtual memory address for the older table walk request. Such a match is what led MTB 106 to establish the younger table walk request as being dependent on the older table walk request in the first place.

Figure 2:
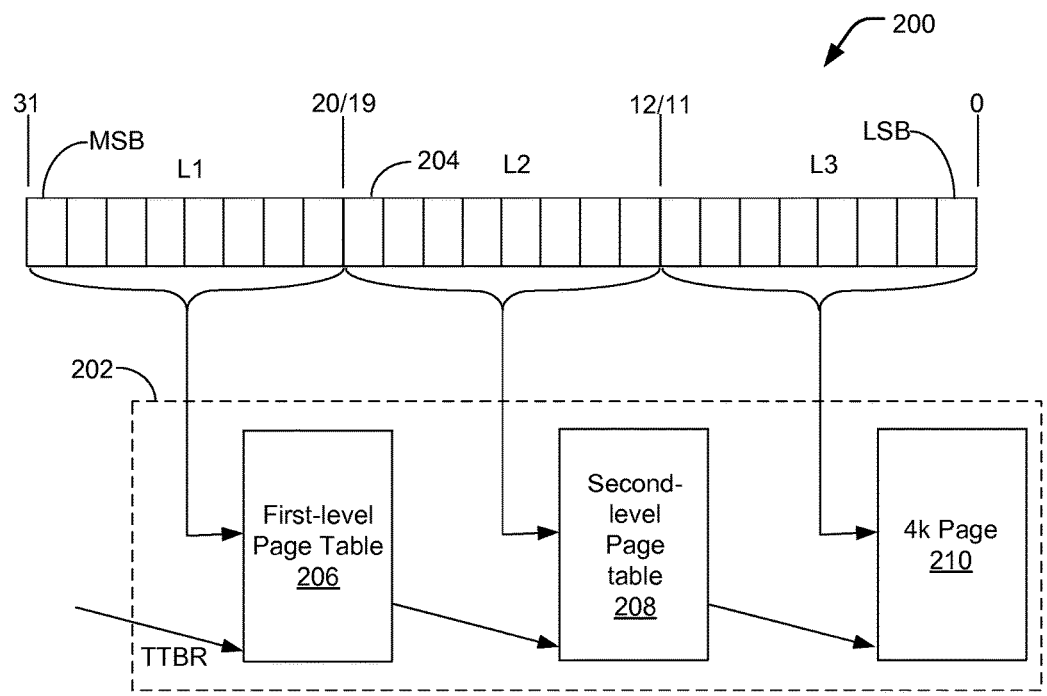
FIG. 2 is a schematic diagram of a memory address and contents of a translation look-aside buffer (TLB), according to some embodiments.

FIG. 2 is a schematic diagram of a virtual memory address 200 and contents of a page table 202, according to some embodiments. In the particular example shown, virtual memory address 200 includes 32 address bits 204 that are grouped into levels L1, L2, and L3. Level L1 includes the most significant bit (MSB) and Level L3 includes the least significant bit (LSB). Specifically, level L1 comprises a range of address bits from bit 20 to bit 31, level L2 comprises a range of address bits from bit 12 to bit 19, and level L3 comprises a range of address bits from bit 0 to bit 11. The different levels correspond to a hierarchy of address levels in page table 202 that include mappings between virtual memory addresses and physical memory addresses. For example, level L1 comprises bits corresponding to a first-level page table 206, level L2 comprises bits corresponding to a second-level page table 208, and level L3 comprises bits corresponding to bytes within a 4 k-byte page 210.

The different levels also correspond to levels in a hierarchy of a search performed during a table walk of page table 202. The less levels that a table walk entails in a search, the less penalties are imposed on a TLB miss that resulted in the table walk.

For example, a table walk for virtual memory address 200 first uses the level 1 index to look up the first-level table pointed to by translation table base register (TTBR), if the descriptor is a block/page. The page walk is then complete and a physical memory address can be generated. If the descriptor is a pointer to a second level of the table, the table walk will use the level L2 index to look up the second-level table pointed to by the first level lookup. If successful, the page walk is complete and a physical memory address can be generated. If not successful, the page walk terminates and a processor error can occur, depending on a particular implementation.

Figure 3:
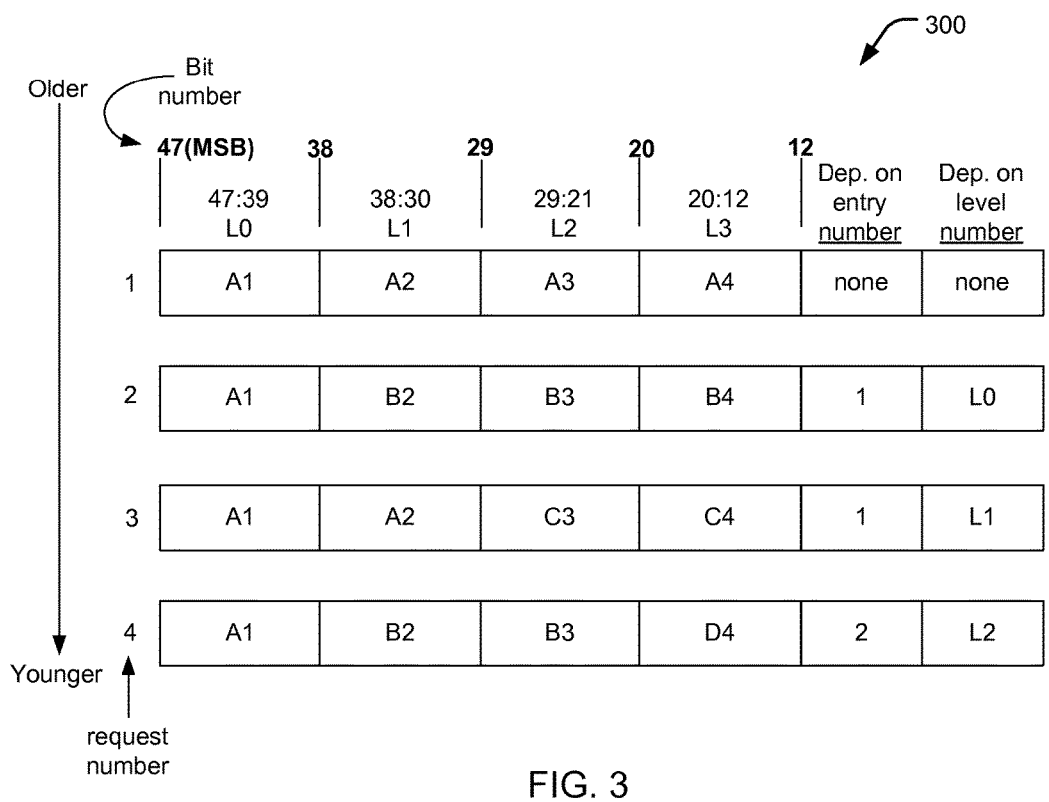
FIG. 3 is a schematic diagram of a virtual address matching process, according to embodiments.

FIG. 3 is a schematic diagram of a virtual address matching process 300, according to embodiments. The four virtual memory addresses shown each encountered a TLB miss that resulted in MTB allocations. In the particular example shown, each of four virtual memory addresses include 48 address bits (only bits 12 through 47 are shown) that are grouped into levels L0, L1, L2, and L3. Level L0 includes the most significant bit (MSB). Specifically, level L0 comprises a range of address bits from bit 39 to bit 47, level L1 comprises a range of address bits from bit 30 to bit 38, level L2 comprises a range of address bits from bit 21 to bit 29, and level L3 comprises a range of address bits from bit 12 to bit 20. The different levels correspond to a hierarchy of address levels in page table, such as page table 202 shown in FIG. 2, for example. Though a particular number of levels and bits are described, this is merely an example, and claimed subject matter is not limited in this respect.

Each of the four virtual memory addresses, which are numbered by request numbers 1, 2, 3, and 4, corresponds to table walk requests managed by an MTB. For example, the table walk requests result from TLB misses. As indicated in the figure, table walk request 1 is the oldest request and table walk request 4 is the youngest request. Each of the four virtual memory addresses is labeled to show their bit contents relative to one another. For example, A1, A2, A3, A4, B2, B3, B4, C3, C4, and D4 each represent a particular string of eight bits. Thus, level L0 for all four virtual memory addresses of the table walk requests is the same, and identified as A1. Levels L0 and L1 for the virtual memory address of table walk request 1 is the same as levels L0 and L1 for the virtual memory address of table walk request 3. Levels L0, L1, and L2 for the virtual memory address of table walk request 2 is the same as levels L0, L1, and L2 for the virtual memory address of table walk request 4. Though a particular number of table walk requests are shown pending, this is merely an example, and claimed subject matter is not limited in this respect.

The four table walk requests are co-pending. The oldest table walk request (request 1) may have resulted in a table walk in progress while the younger table walk requests are on hold, waiting for an outcome of table walk request 1. Whether such a hold is placed on younger table walk requests depends, at least in part, on a dependency between the table walk requests. Such dependency is based, at least in part, on matches between one or more portions of virtual memory addresses associated with the younger table walk requests and the older pending table walk requests. Two columns in the right of FIG. 3 list dependency parameters of the pending table walk requests. Table walk request 1 is not dependent on any pending table walk request. Table walk request 2 is dependent on pending table walk request 1, through level L0. Table walk request 3 is dependent on pending table walk request 1, through level L1. Table walk request 4 is dependent on pending table walk request 2, through level L2.

For the first virtual memory address [A1, A2, A3, A4], there is no dependency. Accordingly, as soon as the MTB receives a table walk request for the first virtual memory address, the MTB will start the table walk. However, because of a dependency on the first virtual memory address, the MTB will place table walk request 2 on hold to wait for an outcome of the table walk of table walk request 1. This dependency arises because the second virtual memory address [A1, B2, B3, B4] matches a portion of the first virtual memory address [A1, A2, A3, A4]: level L0 of each address is the same. Since a portion (L0) of the virtual memory address of table walk request 2 matches a portion (L0) of the virtual memory address of table walk request 1, results of the table walk for table walk request 1 can be used to advance the table walk for table walk request 2 toward completing a translation to a physical memory address. Accordingly, the MTB will begin a table walk for table walk request 2 after the table walk for table walk request 1 is complete through level L0.

In a further example, because of a dependency on the first virtual memory address, the MTB will place table walk request 3 on hold to wait for an outcome of the table walk of table walk request 1. This dependency arises because the third virtual memory address [A1, A2, C3, C4] matches a portion of the first virtual memory address [A1, A2, A3, A4]: levels L0 and L1 of each address are the same. Since a portion (L0+L1) of the virtual memory address of table walk request 3 matches a portion (L0+L1) of the virtual memory address of table walk request 1, results of the table walk for table walk request 1 can be used to advance the table walk for table walk request 3 toward completing a translation to a physical memory address. Accordingly, the MTB will begin a table walk for table walk request 3 after the table walk for table walk request 1 is complete through levels L0 and L1.

In another example, because of a dependency on the second virtual memory address, the MTB will place table walk request 4 on hold to wait for an outcome of the table walk of table walk request 2. This dependency arises because the fourth virtual memory address [A1, B2, B3, D4] matches a portion of the second virtual memory address [A1, B2, B3, B4]: levels L0, L1, and L2 of each address are the same. Since a portion (L0+L1+L2) of the virtual memory address of table walk request 4 matches a portion (L0+L1+L2) of the virtual memory address of table walk request 2, results of the table walk for table walk request 2 can be used to advance the table walk for table walk request 4 toward completing a translation to a physical memory address. Accordingly, the MTB will begin a table walk for table walk request 4 after the table walk for table walk request 2 is complete through levels L0, L1, and L2.

Figure 4:
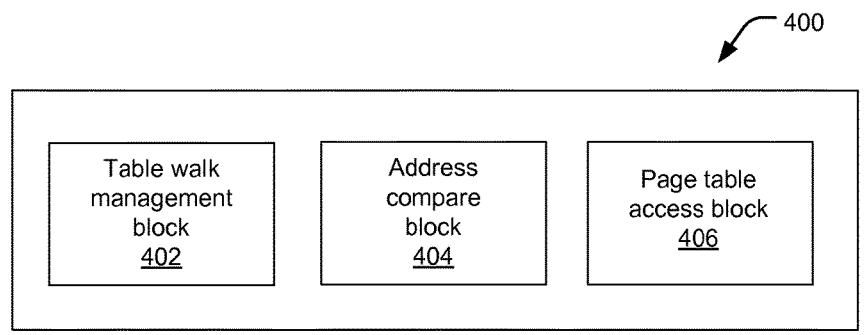
FIG. 4 is a block diagram of a memory translation buffer, according to embodiments.

FIG. 4 is a block diagram of an MTB 400, according to embodiments. A table walk management block 402 manages table walk requests resulting from TLB misses. Such management includes tracking pending table walk requests which may be on hold, pending an outcome of an older table walk request. Table walk management block 402 monitors in-process table walks and monitors their completion. Table walk management block 402 determines whether to place particular table walk requests on hold, or whether to advance the particular table walk requests to a table walk. Such determinations are based, at least in part, on dependencies of the table walk requests on one another. These dependencies are established by comparing respective virtual memory addresses of the table walk requests. Such comparing is performed by an address compare block 404, which compares different levels of virtual memory addresses to one another. A page table access block 406 acts as an interface to a page table. For example, returning to FIG. 1, the double-ended arrow between page table 104 and MTB 106 may represent page table access block 406. Operations of table walk management block 402, address compare block 404, and page table access block 406 may be performed by one or more processors.

Figure 5:
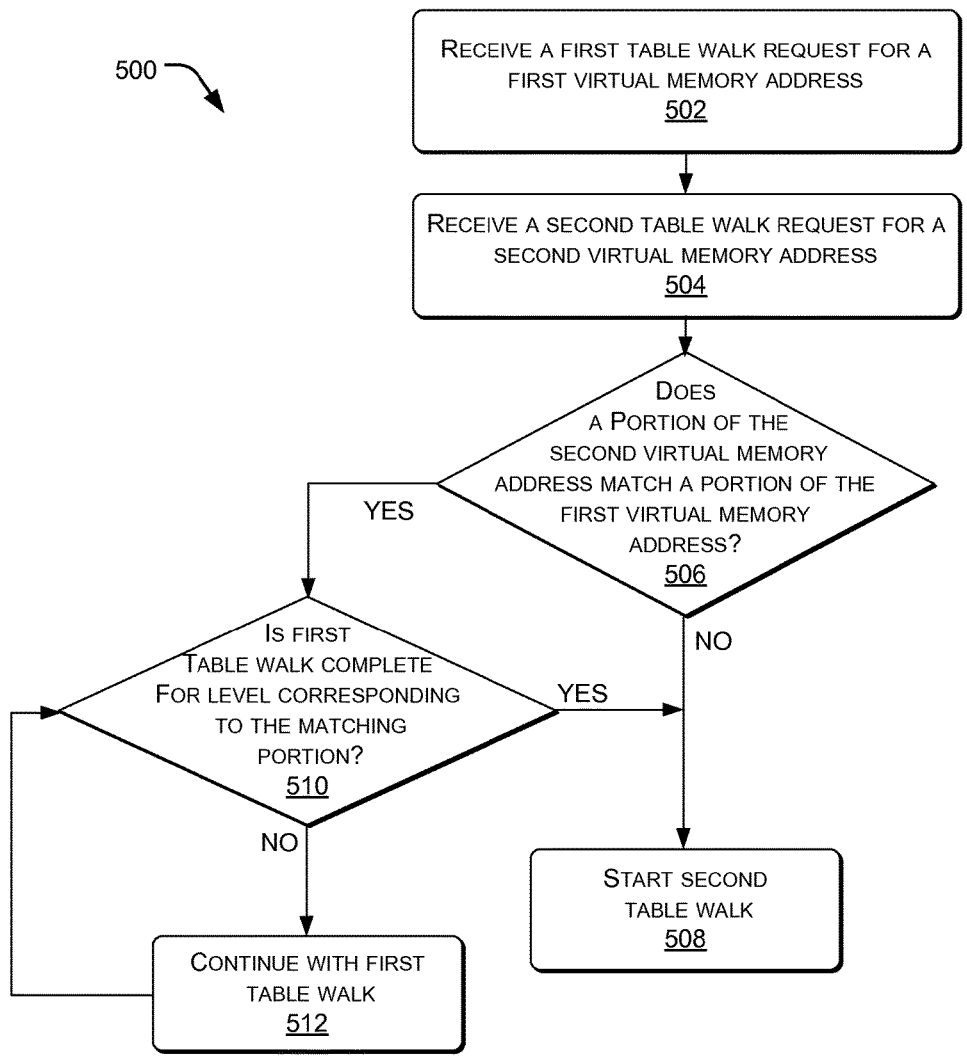
FIG. 5 is a flow diagram of a process of determining when a table walk request advances to a table walk, according to embodiments.

FIG. 5 is a flow diagram of a process 500 of determining when a table walk request advances to a table walk, according to embodiments. Process 500 can be performed by various blocks of MTB 400. At block 502, table walk management block 402 receives a first table walk request for a first virtual memory address. Subsequently, at block 504, table walk management block 402 receives a second table walk request for a second virtual memory address. At diamond 506, address compare block 404 determines whether a portion of the second virtual memory address matches a portion of the first virtual memory address. If not, then the second table walk request has no dependency on the first table walk request. Thus, process 500 proceeds to block 508, where table walk management block 402 will start a page walk for the second page walk request, whether or not a table walk for the first table walk request is complete.

If, however, a portion of the second virtual memory address matches a portion of the first virtual memory address then, at some level, the second table walk request has a dependency on the first table walk request. Thus, process 500 proceeds to diamond 510. Here, table walk management block 402 determines whether the table walk for the first table walk request is complete to a level of the dependency. If so, process 500 proceeds to block 508, where table walk management block 402 will start a page walk for the second page walk request, now that the table walk for the first table walk request is complete. The page walk for the second page walk request can use results of the table walk for the first table walk request. On the other hand, if the table walk for the first table walk request is not complete, process 500 proceeds to block 512 where the table walk management block 402 continues to perform the first table walk. Periodically, or from time to time, process 500 returns to diamond 510 to determine whether the first table is complete. When it finally completes, process 500 proceeds to block 508, where table walk management block 402 will start a page walk for the second page walk request, now that the table walk for the first table walk request is complete.

Figure 6:
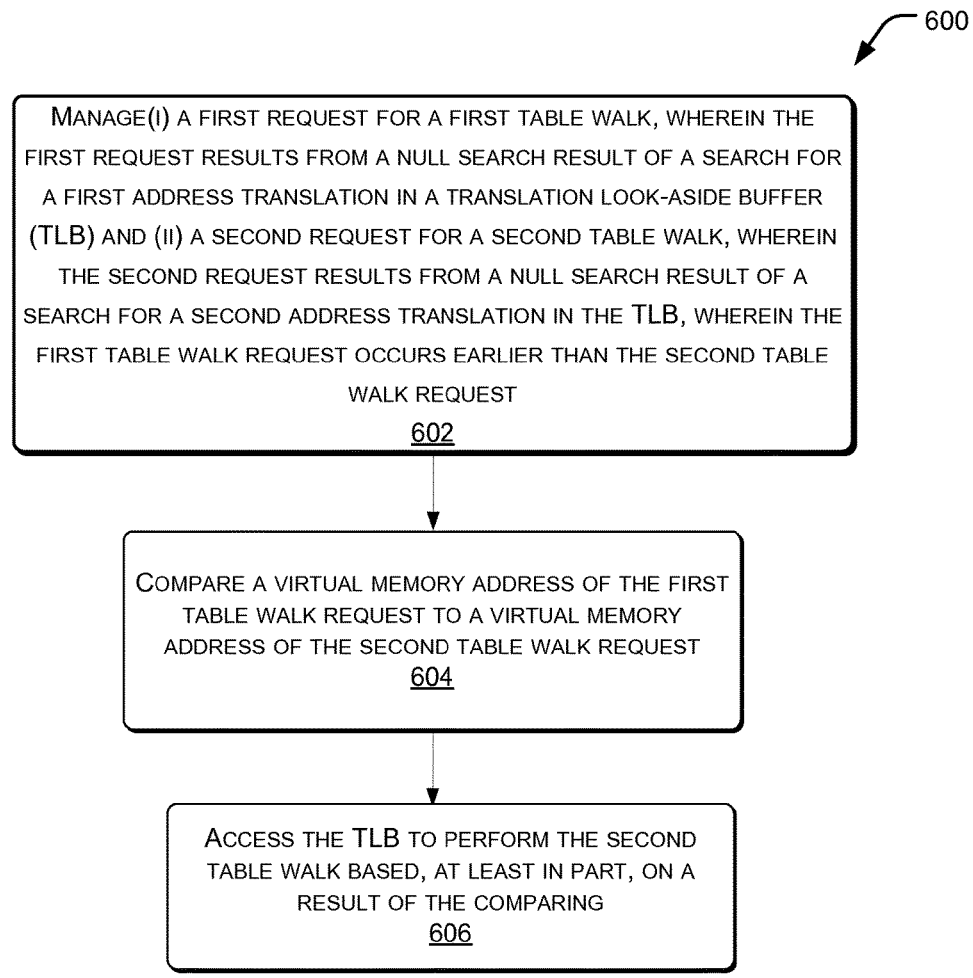
FIG. 6 is a flow diagram of a process of managing table walks, according to some embodiments.

FIG. 6 is a flow diagram of a process 600 of managing table walks, according to embodiments. MTB 400 can perform process 600, for example. At block 602, table walk management block 402 manages a first request for a first table walk, wherein the first request results from a null search result (e.g., a TLB miss) of a search for a first address translation in a TLB. Table walk management block 402 also manages a second request for a second table walk, wherein the second request results from a null search result of a search for a second address translation in the TLB, wherein the first table walk request occurs earlier than the second table walk request. At block 604, address compare block 404 compares a virtual memory address of the first table walk request to a virtual memory address of the second table walk request. At block 606, the page table access block accesses the TLB to perform the second table walk based, at least in part, on a result of the comparing of block 604.

In accordance with various embodiments, an article of manufacture may be provided that includes a storage medium having instructions stored thereon that, if executed, result in the operations described herein with respect to processes 300, 500, and 600 of FIGS. 3, 5, and 6, respectively (and/or various other operations discussed herein). In an embodiment, the storage medium comprises some type of non-transitory memory. In accordance with various embodiments, the article of manufacture may be a computer-readable medium such as, for example, software or firmware. In some embodiments, a system may comprise an MTB configured to perform processes 300, 500, 600.

As used herein, the term "module" or "block" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A device comprising:
   a memory translation buffer, wherein the memory translation buffer is configured to
      manage (i) a first request for a first search in a page table, wherein the first request is responsive to a first null result of a search for a first address translation in a translation look-aside buffer ("TLB") and (ii) a second request for a second search in the page table, wherein the second request is responsive to a second null result of a search for a second address translation in the TLB, wherein the first request for the first search occurs before the second request for the second search;
      compare a virtual memory address of the first request to a virtual memory address of the second request; and
      based, at least in part, on a result of the comparing the virtual memory address of the first request to the virtual memory address of the second request, access the page table to perform the second search,
      wherein the virtual memory address of the first request is a first virtual address, wherein the virtual memory address of the second request is a second virtual address, and wherein the memory translation buffer is further configured to in response to comparing the first virtual memory address to the second virtual memory address, determine that a first section of the first virtual memory address matches with a second section of the second virtual memory address, wherein a third section of the first virtual memory address does not match with any section of the second virtual memory address, and in response to determining that the first section of the first virtual memory address matches with the second section of the second virtual memory address, determine a time to access the page table to perform the second search.

2. The device of claim 1, wherein the result of the comparing comprises a match between at least a portion of (i) the virtual memory address of the first request and (ii) the virtual memory address of the second request.

3. The device of claim 1, wherein the memory translation buffer is further configured to:

compare a portion of the virtual memory address of the first request to a corresponding portion of the virtual memory address of the second request.

4. The device of claim 3, wherein the portion of the virtual memory address of the first request and the portion of the virtual memory address of the second request comprise a range of bits of (i) the virtual memory address of the first request and (ii) the virtual memory address of the second request.

5. The device of claim 4, wherein the range of bits corresponds to a level of translation between a physical address and (i) the virtual memory address of the first request and (ii) the virtual memory address of the second request.

6. The device of claim 1, wherein the memory translation buffer is further configured to:

access the page table to perform the second search in response to the memory translation buffer accessing the page table to perform the first search.

7. The device of claim 1, wherein the translation look-aside buffer includes an intermediate descriptor based, at least in part, on the first search in the page table, and wherein the second address translation is facilitated when the second search in the page table encounters the intermediate descriptor.

8. A system comprising:

a processor;

a translation look-aside buffer to (i) receive a search instruction from the processor and (ii) maintain a cache of address translations; and a memory translation buffer configured to manage (i) a first request for a first search in a page table, wherein the first request is responsive to a first null result of a search for a first address translation in the translation look-aside buffer and (ii) a second request for a second search in the page table, wherein the second request is responsive to a second null result of a search for a second address translation in the TLB, wherein the first request occurs before the second request, compare a virtual memory address of the first request to a virtual memory address of the second request, and based, at least in part, on a result of the comparing the virtual memory address of the first request to the virtual memory address of the second request, access the page table to perform the second search, wherein the virtual memory address of the first request is a first virtual address, wherein the virtual memory address of the second request is a second virtual address, and wherein the memory translation buffer is further configured to in response to comparing the first virtual memory address to the second virtual memory address, determine that a first section of the first virtual memory address matches with a second section of the second virtual memory address, wherein a third section of the first virtual memory address does not match with any section of the second virtual memory address, and in response to determining that the first section of the first virtual memory address matches with the second section of the second virtual memory address, determine a time to access the page table to perform the second search.

9. The system of claim 8, wherein the result of the comparing comprises a match between at least a portion of (i) the virtual memory address of the first request and (ii) the virtual memory address of the second request.

10. The system of claim 8, wherein the memory translation buffer is further configured to:

compare a portion of the virtual memory address of the first request to a corresponding portion of the virtual memory address of the second request.

11. The system of claim 10, wherein the portion of the virtual memory address of the first request and the portion of the virtual memory address of the second request comprise a range of bits of (i) the virtual memory address of the first request and (ii) the virtual memory address of the second request.

12. The system of claim 11, wherein the range of bits corresponds to a level of translation between a physical memory address and (i) the virtual memory address of the first request and (ii) the virtual memory address of the second request.

13. The system of claim 8, wherein the translation look-aside buffer is further configured to maintain an intermediate descriptor among the cache of address translations, wherein the intermediate descriptor is based, at least in part, on the first search in the page table, and wherein the second address translation is facilitated when the second search in the page table encounters the intermediate descriptor.

14. The device of claim 1, wherein the memory translation buffer is further configured to determine the time to access the page table to perform the second search by:

in response to determining that the first section of the first virtual memory address matches with the second section of the second virtual memory address, accessing the page table to perform the second search after at least in part of the first search to search the first section of the first virtual memory address is complete.

15. The system of claim 8, wherein the memory translation buffer is further configured to determine the time to access the page table to perform the second search by:

in response to determining that the first section of the first virtual memory address matches with the second section of the second virtual memory address, accessing the page table to perform the second search after at least in part of the first search to search the first section of the first virtual memory address is complete.

* * * * *